United States Patent [19]

Sorathia et al.

[11] Patent Number: 5,225,124
[45] Date of Patent: Jul. 6, 1993

[54] METHOD FOR IN-SITU CASTING OF FIRE BARRIER SILICONE SHEETS ONTO ACOUSTIC TILES

[75] Inventors: Usman A. Sorathia, Arnold; Wayne C. Jones, Baltimore, both of Md.

[73] Assignee: The United States of America as represented by the Secretary of the Navy, Washington, D.C.

[21] Appl. No.: 929,213

[22] Filed: Aug. 13, 1992

[51] Int. Cl.⁵ ............................................. B29C 67/22
[52] U.S. Cl. .......................... 264/45.3; 264/DIG. 6; 264/46.4; 264/46.5; 264/257
[58] Field of Search ............... 264/DIG. 6, 46.4, 45.3, 264/46.5, 257

[56] References Cited

U.S. PATENT DOCUMENTS

| | | | |
|---|---|---|---|
| 3,007,208 | 11/1961 | Urban | 264/46.5 |
| 3,013,922 | 12/1961 | Fisher | 264/46.5 |
| 3,077,426 | 2/1963 | Johnston | 264/257 |
| 3,124,626 | 3/1964 | Graham et al. | 264/46.5 |
| 3,176,055 | 3/1965 | Loos | 264/46.5 |
| 3,271,222 | 9/1966 | Moorman | 264/DIG. 6 |
| 3,351,374 | 11/1967 | Forsyth et al. | 264/46.5 |
| 3,353,981 | 11/1967 | Jacob | 264/DIG. 6 |
| 3,425,885 | 2/1969 | Webb | 264/DIG. 6 |
| 4,021,589 | 5/1977 | Copley | 264/DIG. 6 |
| 4,025,686 | 5/1977 | Zion | 264/46.5 |
| 4,250,136 | 2/1981 | Rex | 264/DIG. 6 |
| 4,522,578 | 6/1985 | Martin, Jr. et al. | 264/46.5 |
| 4,726,987 | 2/1988 | Trask et al. | 156/285 |
| 4,731,763 | 3/1988 | Wagner | 264/272.16 |
| 4,818,603 | 4/1989 | Mueller | 428/317.1 |
| 4,822,659 | 4/1989 | Anderson et al. | 428/268 |
| 5,015,522 | 5/1991 | McCullough, Jr. et al. | 428/398 |

FOREIGN PATENT DOCUMENTS

| | | | |
|---|---|---|---|
| 47-027338 | 7/1972 | Japan | 264/46.5 |
| 56-030833 | 3/1981 | Japan | 264/46.5 |

OTHER PUBLICATIONS

Naval Engineers Journal, "Syntactic Foams for Deep Sea Engineering Applications", (Apr. 1968), pp. 235-243.
Bisco Product's Technical Data Sheet for "FPC Fireblock" dated Dec. 1, 1991.
Bisco Product's "The Heat Stops Here" 1991.

Primary Examiner—Allan R. Kuhns
Attorney, Agent, or Firm—Gary G. Borda

[57] ABSTRACT

A method of protecting acoustic and damping tiles from fire damage by placing a fire barrier silicone foam sheet on the inner surface of a mold, mounting the mold at a selected distance from the surface of a hull of a vessel with the fiberglass cloth side of the silicone foam sheet facing the hull and spaced therefrom, injecting a polyurethane foam into the space between the hull surface and the silicone foam sheet, curing the polyurethane foam, and removing the mold. The porosity of the polyurethane foam is imparted by incorporation of 5-50% by volume of Saran ® microspheres.

4 Claims, No Drawings

METHOD FOR IN-SITU CASTING OF FIRE BARRIER SILICONE SHEETS ONTO ACOUSTIC TILES

BACKGROUND OF THE INVENTION

1. Field of the Invention

This invention relates to protection of acoustic and damping materials against fire. It further relates to conjoining fire barrier and acoustic materials.

2. Review of the Prior Art

Acoustic and damping materials have been developed for application to areas of both surface ships and submarines to reduce their signatures. Acoustic tiles may be made with porous polyurethane. These tiles may be cast in place onto the hull within a mold. Curing occurs at room temperature and takes place in one day. At the end of the post curing cycle, the mold is removed. Alternatively, the tiles may be molded elsewhere to the hull's shape and be installed onto the hull at a later time, using an epoxy resin as glue. The polyurethane is up to two inches in thickness and its acoustic properties may be enhanced by incorporation of 5–50% by volume of plastic microspheres as, for example, 561DE grade of Saran ® microspheres obtained from Nobel Industries of Sweden.

When in drydock, however, there is concern about the initiation of a fire involving these tiles, started from either a trash fire or welding operations. When tested in accordance with ASTM E-162, the polyurethane tile flame spread index is over 1000 with dripping of melted and burning plastic, thereby potentially endangering personnel and rapidly spreading the fire.

It is possible to lower the flame spread index of a polyurethane material by incorporating high levels of flame retardant fillers. However, this approach has been shown to affect severely the physical properties of the material and compromise its purpose.

Damping tiles, typically made of polyvinyl chloride and graphite, do not contain plastic microspheres. They are cast elsewhere and glued into place with an epoxy resin in the same manner as acoustic tiles. They are also susceptible to the same burning and dripping problems as acoustic tiles.

There is consequently a need to conserve the acoustic dampening characteristics of the tiles and simultaneously to protect the tiles from fire damage and especially from ignition while a vessel is in drydock. Both the polyurethane foam tiles and the damping tiles, moreover, are flexible. This important characteristic must also be preserved while protecting the tiles from fire damage and ignition. The need for retaining this flexibility obviously excludes considering a phenolic sheet as the fire barrier.

U. S. Pat. No. 4,822,659 describes a thermally insulative fire block sheet having an elastomeric layer which has a surface flammability flame spread index of zero at 20 minutes of exposure in accordance with ASTM E-162 and which is capable, in a thickness of 1/16 inch, of blocking a flame of 1900° F. for more than an hour. This sheet comprises at least two layers. One layer, facing the direction of the flame, is a silicone foam rubber comprising the reaction product of a vinyl terminated polysiloxane containing —$Si(CH_3)_2O$— units and an organohydrogensiloxane polymer containing $Si(H)(CH_3)O$— units. The silicone foam rubber also contains alumina trihydrate. The other layer is an adherent flame resistant support layer for the foam, preferably a glass cloth layer.

A commercial product of the assignee of the aforementioned patent, Bisco Products, 2300 East Devon Avenue, Elk Grove Village, Ill. 60007-6120, is identified as FPC ® Fireblock. It is a reinforced elastomeric foam, available in tape and continuous sheet form, that is designed for critical fireblocking applications. FPC ® Fireblock is a two layer system wherein one layer is a silicone foam; the other layer is glass fiber cloth. It is flexible, non-toxic, has very low smoke generation upon combustion, and resists burn-through when exposed to a 1900° F. flame for over one hour. Its Flame Spread Index is 0–5 at 0.062 inch when tested according to ASTM E-162. Its Smoke Density (Flaming) is 19 at 4 min. (Dm) and 68 at Max. (Dm) when tested according to ASTM E-662. Its Heat Release Rate—OSU is 47 kW/$m^2$ at peak and 31 kW-min./$m^2$ at total—2 min.

SUMMARY OF THE INVENTION

It is accordingly an object of this invention to provide a method for protecting polyurethane and damping tiles from fire damage, while a hull on which they are mounted is exposed to air, and for preserving the acoustic properties of the tiles, while the hull is exposed to water.

In accordance with this object and the principles of this invention, it has surprisingly been discovered that polyurethane foam can be cast in-situ onto a hull, to form an acoustic dampening layer between the hull and an outer fire barrier layer. By casting in-situ, the polyurethane foam is simultaneously bonded to both the hull and a silicone foam layer, which will function as the outer fire barrier, without use of adhesives to provide bonding between the polyurethane foam and reinforced silicone foam layers or between the polyurethane foam layer and the hull. It was also surprisingly discovered that the reinforced silicone foam sheet did not interfere in any way with the acoustic dampening properties of the polyurethane foam tile.

If the acoustic tiles are molded for later installation, the mold is shaped to match individual areas of the hull. The silicone foam sheet is placed against one side of the mold so that the glass cloth faces toward the open space, and the polyurethane foam is then injected into the mold so that it is completely filled. After curing, the mold is removed, and the tile is fitted, using an adhesive, onto the exact portion of the hull for which it is shaped, with the fire barrier being the outside surface.

Flame spread tests in accordance with ASTM E-162 were made of several composite tiles, each consisting of a polyurethane foam and a fire barrier sheet, that appeared to offer protection against flame spread in the polyurethane foam. The dramatic differences in the results of flame spread testing of various composite tiles can be summarized as follows:

| Tile Description | ASTM E-162 Results |
| --- | --- |
| Polyurethane Foam | 1100 |
| Polyurethane Foam + Silicone Sheet | 38 |
| Polyurethane Foam + Neoprene Sheet, 45 mils | 400 |
| Polyurethane Foam + Neoprene Sheet, 60 mils | 156 |
| Polyurethane Foam + PBI/Aramid Sheet | 305 |

The fire barrier technology of this invention is not only useful for protecting the hulls of vessels from fire damage while in drydock, it is also useful for solving many current problems by providing a universal material to protect the cores of structures from fire damage.

DESCRIPTION OF THE PREFERRED EMBODIMENTS

Flame spread testing was done on numerous materials that potentially offered flame spread protection to polyurethane foam tiles. Additives to the polyurethane foam were tried. It was found that they made the flame spread index look better initially but made smoke worse and additionally impaired acoustic properties.

The invention is more fully described in the following examples.

EXAMPLE 1

A silicone foam/glass cloth fire barrier was installed on a U.S. Naval vessel that was in drylock being fitted with tiles. A sheet of FPC ® Fireblock, a silicone foam sheet sold by Bisco Products, was positioned, glass cloth side facing inwardly towards the hull against the inner surface of a mold. The mold's inner surface is carefully contoured to conform to the shape of the hull. Once in place, the inner surface of the mold is located at a carefully calculated distance from the hull. This distance varies from 0.5 inch to two inches, depending upon location on the hull in relation to predicted sonic impact thereupon. The silicone foam sheet has a uniform thickness of 1/16 inch.

The mold was then mounted on the hull so that it was spaced therefrom at the calculated distance. Polyurethane containing a selected quantity of Saran ® microspheres was injected into the space between the hull and the silicone sheet until this space was completely filled. About 24 hours later, the mold was removed, leaving the hull covered with the acoustic tiles surfaced with the silicone foam barrier.

Before the vessel was scheduled to leave the drydock, a design change required that an opening be cut into the hull through the acoustic tiles. A hole was first cut into the acoustic material and silicone foam barrier to expose the underlying hull. A steel plate was then placed at the bottom of the hole to protect the acoustic material during cutting, by welder's torch, of an opening in the steel hull. During the cutting of the hull, the torch was inadvertently placed against the silicone foam barrier. When the torch was removed from the silicone foam barrier, a heated streak was evident, but there was no sign of ignition of the underlying polyurethane.

EXAMPLE 2

A neoprene sheet, onto which a polyurethane foam had been cast in situ, was tested for flame spread according to ASTM E-162. Initially, nothing seemed to happen, so that the result appeared to be encouraging. However, because the neoprene sheet was solid, it conducted heat therethrough to the polyurethane foam, and pieces of the neoprene sheet began to fall off, and then globs of melted and burning polyurethane dripped away from the test area.

EXAMPLE 3

A PBI/aramid sheet (polybenzene amide with aramid fiber) was attached to a polyurethane foam tile with an epoxy resin before conducting a test according to ASTM E-162. It was also a failure.

EXAMPLE 4

Polyurethane foam was cast onto the glass fiber cloth side of a silicone foam sheet within a mold. The silicone foam side was then exposed to the 1,900° F. flame of a propane torch in accordance with ASTM E-162. After 15 minutes, a small hole had been burned into the silicone foam, exposing the glass fiber cloth therebeneath, and a blackened recession could be seen in the polyurethane foam beneath the glass fiber cloth, but no spreading or dripping had occurred. Indeed, the silicone sheet apparently permitted a minimum of heat to pass through it and also allowed little oxygen to reach the polyurethane foam, so that it had not ignited. The test was very successful and was given an ASTM E-162 result rating of 38.

It is known that those skilled in this art may make many variations and modifications of the preferred embodiments described hereinbefore, but all such variations and modifications are to be understood as within the spirit and scope of the invention, as defined in the accompanying claims.

What is claimed is:

1. A method of in-situ casting of acoustic tiles onto fire barrier sheets for protecting the acoustic tiles from fire exposure, comprising:

providing a mold for mounting to a hull, said mold having an inner surface conforming to the shape of said hull, providing a fire barrier sheet having a silicone foam layer and a glass cloth layer, placing said fire barrier sheet against said inner surface of said mold, said silicone foam layer abutting said inner surface and said glass cloth layer facing away from said inner surface, mounting said mold to said hull at a selected distance from said hull with said glass cloth layer of said fire barrier sheet facing towards said hull to form a space therebetween, injecting a polyurethane acoustic foam into said space between said hull and said fire barrier sheet, curing said polyurethane acoustic foam, and removing said mold.

2. The method of claim 1, wherein said polyurethane foam contains plastic microspheres.

3. The method of claim 2, wherein said plastic microspheres are made of Saran ®.

4. The method of claim 3, wherein said microspheres are 5–50% by volume of said polyurethane foam.

* * * * *